United States Patent [19]

Downey

[11] 4,150,192

[45] Apr. 17, 1979

[54] HOT MELT RUST RETARDANT COMPOSITE

[75] Inventor: Raymond E. Downey, Akron, Ohio

[73] Assignee: The Goodyear Tire & Rubber Company, Akron, Ohio

[21] Appl. No.: 812,937

[22] Filed: Jul. 5, 1977

[51] Int. Cl.$^2$ ............................ E06B 3/12; C09D 5/08
[52] U.S. Cl. .................................. 428/462; 106/14.33; 252/33; 252/59; 252/49.7; 252/389 R; 260/28.5 B; 427/422; 428/467
[58] Field of Search ..................... 428/462, 467, 497; 427/422, 426, 409; 260/28.5 B; 106/14; 252/33, 59, 49.7, 389 R

[56] References Cited

U.S. PATENT DOCUMENTS

| | | | |
|---|---|---|---|
| 2,514,979 | 7/1950 | Turner et al. | 260/28.5 B |
| 2,593,676 | 4/1952 | Irwin | 106/14 |
| 2,816,842 | 12/1957 | Westlund et al. | 106/14 |
| 3,004,854 | 10/1961 | Alexander et al. | 106/14 |
| 3,434,851 | 3/1969 | Miller | 106/14 |
| 3,746,643 | 7/1973 | Rogers | 252/33 |

*Primary Examiner*—John T. Goolkasian
*Assistant Examiner*—J. J. Gallagher
*Attorney, Agent, or Firm*—H. C. Young, Jr.

[57] ABSTRACT

A sprayable hot melt rust inhibitor composite comprised of a mixture of a sulfonate, optionally a carbonate, optionally an oxidized petrolatum, diluent oil, microcrystalline wax, active filler and thermoplastic resin. The invention also relates to metal substrates coated with said composite including the undercoating of an automotive vehicle.

16 Claims, No Drawings

HOT MELT RUST RETARDANT COMPOSITE

This invention relates to a sprayable, hot melt rust inhibitor coating composite. The invention further relates to a coated metal substrate with such a composite, including an undercoated automobile or transportation vehicle. The invention additionally relates to a compounded rust inhibitor composition which uniquely can be can be applied by spray coating as a hot melt to form a rust inhibiting coating which essentially instantly sets up on the substrate yet has a tendency to heal itself after receiving sharp impacts.

Inhibiting rust formation on various metal surfaces, particularly including iron-containing automotive products which are exposed to salt, or sodium chloride, is highly desirable. Various solutions have been suggested and some have been utilized.

For example, calcium and magnesium sulfonates in a minor amount of mineral oil have been taught to be useful as rust inhibitor coatings when combined with a microcrystalline wax (U.S. Pat. No. 3,746,643).

Various mixtures utilizing pigments such as powdered aluminum and basic lead silico-chromate have been taught to be useful as corrosion-resistant coatings.

However, for a commercially suitable spray coating application such as an assembly line for product fabrication, such compositions would typically be designed to be applied in a volatile organic solvent or dispersion.

Although the benefits of sprayability are obtained, nevertheless, the production facility is inherently exposed to the flammable, perhaps explosive, and normally toxic atmosphere provided by the solvent. In addition, further fabrication steps in the manufacturing process must usually wait until the sprayed-on coating composition has been dried in some kind of a drying station.

Therefore, it is an object of this invention to provide a rust inhibitor composite which can be suitably spray-coated onto a substrate to form a coating thereon, and to provide such a coated substrate.

In accordance with this invention, a sprayable hot melt rust inhibitor composite has been discovered which comprises (A) 100 parts by weight of a petroleum sulfonate complex in a non-volatile diluent oil comprised of (1) about 15 to about 30, preferably about 18 to about 30, weight percent of at least one sulfonate selected from calcium and magnesium sulfonates, (2) about zero to about 10, preferably about 7 to about 10, weight percent of at least one carbonate selected from calcium and magnesium carbonates, (3) about zero to about 8, preferably about 4 to about 8, weight percent of a semi-solid, oxidized petrolatum having a melting point in the range of about 45° C. to about 60° C., a specific gravity in the range of about 0.82 to about 0.88 at 60° C., and oxidized with oxygen to an extent of about 35 percent to about 65 percent, and (4) about 60 to about 70 weight percent non-volatile diluent oil, (B) about 20 to about 60 parts by weight microcrystalline wax, (C) about 20 to about 40 parts by weight of a particulate filler having a particle size in the range of about 5 to about 40 microns selected from at least one of powdered aluminum, basic lead silico-chromate, zinc molybdate, strontium molybdate, zinc phosphate and strontium chromate, and (D) about 20 to 60 parts by weight of a hydrocarbon derived thermoplastic resin having a softening point in the range of about 65° C. to about 140° C. and containing carbon-to-carbon unsaturation therein, wherein said hot melt composite is characterized by having a viscosity in the range of about 4000 to about 15,000 centipoises (cps) at 125° C. as determined by LVF Brookfield viscometer spindle No. 3 at 12 rpm and further characterized by a decreasing viscosity with increasing rate of shear.

An important feature of this invention is that the viscosity of composite, through application of heat and shear is substantially reduced and the composite, under these conditions, is rendered sprayable by conventional techniques.

An additional important feature is that the fluid composite, upon being sprayed onto a metal substrate substantially immediately sets up. This feature has been observed to be sufficiently dramatic that the applied coating of the composite on a vertical surface had such a resistance to flow that other operations could be conducted on the substrate, such as various assembly steps and even painting portions of the substrate not already coated by the composite.

Indeed, the composite coating on the substrate can be heated to a temperature above its spray application temperature without exhibiting an appreciable flow.

These features become especially important in an assembly line, such as an automobile fabrication operation, where it is desired to first apply a rust inhibiting composite coating to a portion of a metal substrate or panel, then apply a paint coat and bake the paint coat on another part of the substrate or panel.

Accordingly, the invention further relates to the rust inhibiting composite coating on a metal substrate and particularly to an undercoated automobile where the undercoat is the rust inhibiting composite of this invention.

Exemplary of the important viscosity reduction upon application of shear is that it has been observed that, with an LVF Brookfield viscometer using No. 3 spindle with rpm's of 6, 12 and 30, at 125° C., viscosities of 15, 600, 8500 and 4000 cps, respectively, have been observed.

Therefore, the composite has been found to not only inhibit rust formation on metallic surfaces but it also can be applied by hot melt application at a temperature in the range of about 125° C. to about 180° C. It is conveniently applied as a fluid spray coat under shear through an orifice in a spray head onto a metal substrate and sets up essentially immediately, within about 5 to about 10 seconds, when the substrate has a temperature in the range of about 25° C. to about 75° C., without the requirements of volatile solvent evaporation.

Uniquely, the applied composite typically has the ability to heal itself upon being dented by an impacting object. This effect is apparently because that although the adhesive strength of the composite enables it to adhere to a substrate to the extent that it is very difficult to physically remove, its internal cohesive strength is poor. Therefore, when the coating of the composite is hit with an impacting object, such as a stone, it yields yet it tends to seal back over itself.

The combination of good adhesive strength and low or poor internal cohesive strength apparently aid the rust inhibiting quality of the composite under a salt spray test.

For the salt spray test, a cold rolled steel panel is coated with the composite. The coated surface is scribed with an awl to form two intersecting lines in the form of an "X". With the sharp awl scribing the coated panel under hand pressure, as distinguished from the effect of an impacting stone, the coating is removed in the grooves of the "X" part of the scribed panel.

The salt spray test is described by ASTM No. B-117 and is conducted by placing a scribed coated metal panel inside of an enclosure into which an atomized fog at about 105° F. of an aqueous 5 weight percent salt or sodium chloride, solution is maintained. The individual coated panels are positioned at an inclination of about 30° to vertical inside the enclosure during the test. The coated panels are withdrawn from the test enclosure after 500 and/or 1000 hours and inspected.

Typically, the grooves of the scribed metal easily rust. The real test is whether the composite coating interface adjacent to the grooves inhibits further rust formation which undercuts, and possibly even delaminates, the composite coating itself.

If there is a substantial amount of rust on the metal substrate, or panel, undercutting the coating adjacent the scribed area, the results are rated poor. If there is little or no rust undercutting the coating, the test is rated as excellent.

In the description of this invention, the basic lead silico-chromate can generally be described as a mixture having an average particle size in the range of about 3 to about 12 microns, a specific gravity in the range of about 4 to about 4.5, and comprised of about 40 to about 75 weight percent lead oxide, primarily and particularly lead dioxide, about 40 to about 55 weight percent silicon dioxide and about 4.5 to about 6.5 weight percent chromium oxide, primarily and particularly chromium trioxide, where the mole ratio of lead to chromium is in the range of about 3/1 to about 5/1. The basicity is comparable to a pH in the range of about 8 to about 9.

In the practice of this invention a quantitative amount of the non-volatile diluent oil is used in the preparation of the sprayable hot melt composite. A wide range of such non-volatile diluent oils can normally be used with the primary requirement that the oil is a solvent for the sulfonate. Representative of the various oils are those having boiling points above about 230° C. which include mineral lubricating oils obtained by the typical and conventional refining procedures, synthetic lubricating oils, such as polymers of propylene, polyoxyalkylenes, polyoxypropylene, dicarboxylic acid esters, esters of phosphorous, synthetic hydrocarbon lubricating oils, such as dialkyl benzenes, diphenyl alkanes, alkylated tetrahydronaphthalene, vegetable oils, such as corn oil, cotton seed oil and castor oil and animal oils such as lard oil and sperm oil. Preferable oils are the mineral lubricating oils and synthetic lubricating oils, particularly the mineral lubricating oils.

Of the various sulfonates and carbonates used in the practice of this invention, the calcium sulfonate and calcium carbonate are preferred. In the further practice of this invention, a small amount of oxidized petrolatum can suitably be used. Such petrolatum is typically a colorless, transparent solid or semi-solid which has been oxidized. The soft, oxidized petrolatum particularly aids in the practice of this invention by adding dimensional stability and body to the composite in a form that is resistant to further oxidation. For further reference to petrolatum, see the definition in The Condensed Chemical Dictionary, Seventh Edition, copyright 1966, by Reinhold Publishing Corporation.

For the composite of this invention microcrystalline wax is used. Such a wax refers to a wax material which is obtained usually from the residual product of vacuum distillation of lubricating oils. They are understood to contain only a minor amount of straight chain paraffinic hydrocarbons. They are reported to have melting points in the range of about 65° C. to about 90° C. According to the Condensed Chemical Dictionary (infra), such a wax is derived from petroleum and is characterized by the fineness of its crystals in distinction to the larger crystals of paraffin wax. They are reported to be of high molecular weight saturated aliphatic hydrocarbons such as, for example, $C_{48}H_{98}$. If desired, a minor amount, such as up to about 10 weight percent based on the microcrystalline wax, of paraffinic wax of the larger crystal size can be added, although only microcrystalline wax is preferred. Reference to U.S. Pat. No. 2,983,664 may be made for an example of microcrystalline wax preparation.

It is important to appreciate that the filler additive is an important feature of this invention and is generally described as active particulate filler. Of the various active fillers presented by the description of the invention, the basic lead silico-chromate and powdered aluminum are preferred.

Additional fillers can be added to the composite, if desired, which are more in the nature of extender pigments. Representative of various additional fillers include calcium carbonates, aluminum hydrates, carbon black, clays and silicates.

The composite of this invention can conveniently be mixed and prepared by melting together the microcrystalline wax, thermoplastic resin and petroleum sulfonate complex at a temperature in the range of about 90° C. to about 150° C. and mixed to a smooth consistency. The active filler, or pigment, is then added and the mixing continued at a temperature in the range of about 90° C. to about 150° C. until a smooth, homogeneous mixture is obtained. The resulting composite is then usually removed from the mixer and cooled.

The hot melt composite can be applied as a spray application by heating to a temperature in the range of about 150° C. to about 180° C. and sprayed through a spray head at a hydraulic pressure in the range of about 1000 to about 1500 psi.

Generally a coating is applied to a substrate, typically a metal substrate, itself having a temperature in the range of about 20° C. to about 40° C., where it sets up within about 10 seconds to provide a coating having a thickness in the range of about 3 to about 15 mils. The metal substrate itself may be bare metal, may have a coat of primer on it, or may be painted before application of the hot melt composite.

The practice of this invention is further illustrated by reference to the following examples which are intended to be representative rather than restrictive of the scope of the invention. Unless otherwise indicated, all parts and percentages are by weight.

EXAMPLE I

Hot melt compositions were prepared using the recipes in the following Table 1 and identified as compositions A, B and C.

Table 1

| Compound | Parts | | |
|---|---|---|---|
| | A | B | C |
| Petroleum sulfonate complex in mineral oil[1] | 100 | 100 | 100 |
| Microcrystalline wax[2] | 40 | — | 20 |
| Tackifying Resin[3] | 40 | 40 | 40 |
| Silica filler[4] | 20 | — | — |
| Silica filler[5] | — | 10 | — |

Table 1-continued

| Compound | Parts | | |
|---|---|---|---|
| | A | B | C |
| Solid Plasticizer[6] | — | 10 | — |
| Basic lead silica-chromate[7] | — | — | 20 |
| Viscosity at 121° C. (cps)[8] | 4500 | 3700 | 2900 |
| Viscosity at 135° C. (cps)[8] | 4000 | 8000 | 2600 |
| 500 hour salt spray[9] | Bad. | Fair | Excellent |

[1]A mixture reported to contain about 20 weight percent calcium sulfonate, about 8 weight percent calcium carbonate, about 66 weight percent mineral oil and about 6 percent oxidized petrolatum obtained as Saci 200A, a trademark of the Witco Chemical Company.
[2]Microcrystalline wax with melting point of about 90° C. obtained as Multiwax 195 M, a trademark of the Witco Chemical Company.
[3]An olefin/diolefin copolymer resin having a softening point of about 100° C., obtained as Wing-tack 95, a trademark of The Goodyear Tire & Rubber Company.
[4]A silica pigment obtained as Ucar, a trademark of The Harwick Standard Company.
[5]A silica pigment obtained as Microcel E, a trademark of The Johns Manville Company.
[6]A plasticizer of the PVC type obtained as Santicizer 9, a trademark of The Monsanto Chemical Company.
[7]Basic lead silico-chromate, obtained as Oncor M50, a trademark of The National Lead Company.
[8]The viscosity was measured with model LVF Brookfield Viscometer, spindle No. 3 at 12 rpm.
[9]The coated substrates were subjected to a salt spray test according to ASTM-D-117 for 500 hours.

The basic lead silico-chromate was described as being composed of about 46 to 49 weight percent lead dioxide, about 45.5 to about 48.5 weight percent silicon dioxide and about 5.1 to about 5.7 weight percent chromium trioxide with a mole ratio of lead dioxide to chromium trioxide of about 4/1, a particle size of about 7 microns and a pH in the range of about 7.8 to about 8.8.

The microcrystalline wax was described as having a wax melt point of 190°-205° F. according to ASTM D-127, a needle penetration of 77° F. according to ASTM D-1321-57, a Saybolt viscosity of about 210° F. according to ASTM D-88-75/90, and a flash point of about 100° F. according to ASTM D-92-55.

The individual composites were prepared in the following manner. The microcrystalline wax and tackifying resin were melted by heating in a container with the mineral oil petroleum sulfonate complex. The materials became fluid at about 135° C. to 150° C. An air stirrer was used to mix the fluid materials. A smooth homogeneous mixture was obtained after about 10–15 minutes of mixing. While still stirring and maintaining the temperature at about 135°–150° C., the silica or basic lead silicochromate pigments were added.

The fluid composite was spray coated onto cold rolled steel panels through a Model XI Nordson Corporation hot melt spray unit, obtained from the Nordson Corporation at a temperature in the range of about 135° C. to about 150° C. with the substrate at a temperature of about 30° C. The resulting coating instantly set up in about 5 to about 10 seconds, to where it did not apparently flow, to a thickness of about 5–10 mils.

After cooling to about 30° C., the coating was scribed, or scratched, down to the metal with an awl to form an "X" with lines about two inches long. The scribed grooves remained as bare metal.

The scribed, coated, metal panels were then exposed to a salt mist for 500 hours according to ASTM D-117. After the salt spray treatment, the scribed, coated panels were visually inspected and rated according to the amount of rust in the scribed area which undercut the adjacent composite coating. All of the panels had some rust directly in their scribed lines.

In this regard, panel A of experiment A was given a bad rating because there was much rust in the scribed area and considerable rust undercutting the coating. Panel B was given a fair rating because there was only a moderate amount of rust in the scribed area and little undercutting. Panel C was given an excellent rating because there was little or practically no rust in the scribed area and no undercutting.

In the practice of this invention, the hydrocarbon derived thermoplastic resin is characterized by having a softening point in the range of about 65° C. to about 140° C. although a more preferable softening point is in the range of about 65° C. to about 120° C. The thermoplastic resin contains carbon-to-carbon unsaturation and typically the type having the characteristic of a monomer mixtures polymerized with a Friedel-Crafts type catalyst comprised of at least one monoolefin and at least one multi-olefin selected from aliphatic diolefins and aromatic hydrocarbons. In this regard, a preferable Friedel-Crafts type catalyst is aluminum chloride, although typically ethylaluminum dichloride can also be used. Of lesser desirability is a Friedel-Crafts catalyst such as boron trifluoride and boron trifluoride etherate which, for some monomer mixtures, will produce a resin with too low of a softening point.

Although the monomer mixture can be entirely a mixture of aliphatic olefins and diolefins, it is preferred that the mixture comprises about 5 to about 65, and more preferably about 10 to about 60, weight percent aromatic hydrocarbons, based on the monomer mixture.

Representative of various aliphatic diolefins, for example, is piperylene.

Representative of various aliphatic cyclic olefins are cyclopentene, cyclohexane and cycloheptene.

Representative of various aliphatic cyclic diolefins are dicyclopentadiene and cyclopentadiene.

Representative of various aromatic hydrocarbons are styrene, α-methyl styrene, vinyl toluene and divinylbenzene.

Representative of naturally occurring terpene hydrocarbons are α-pinene, β-pinene, limonene, dipentene and β-philandrene.

Therefore, for example, a representative hydrocarbon derived resin is a monomer mixture polymerized in the presence of aluminum chloride comprised of piperylene, as the diolefin, and, as the monoolefin, at least one of 2-methyl-2-butene, 2-methyl-1-butene, 2-methyl-1-pentene, 2-methyl-2-pentene, 2,3-dimethyl-1-butene, and 2,3-dimethyl-1-butene, preferably primarily 2-methyl-2-butene.

The diolefin/olefin weight ratio is in the range of about 0.8/1 to about 4/1. Particularly preferable for the monoolefin is 2-methyl-2-butene. Such a resin can typically have a softening point in the range of about 80° C. to about 110° C. The monomer mixture can be modified by the addition of about 2 to about 15 weight percent dicyclopentadiene with an attendant increase in softening point range to about 90° C. to about 120° C.

The monomer mixture can be further modified by the addition of about 5 to about 65, preferably about 10 to about 60, and even more preferably, about 10 to about 40, weight percent α-methyl styrene, especially when using a piperylene/olefin weight ratio in the range of about 1.5/1 to about 4/1. This modification can be effective with and without the dicyclopentadiene additive.

As a further example of a hydrocarbon-derived resin of high aromatic content, such a resin can be provided by polymerizing in the presence of aluminum chloride, a monomer mixture comprised of (A) at least one of vinyl toluene, α-methyl styrene or styrene, preferably vinyl toluene, as the monomer having aromatic character, and (B) as the olefin, at least one cycloolefin selected from at least one of dicyclopentadiene, cyclopentadiene, cyclopentene, cyclohexene and cycloheptene, although minor amounts of other and higher molecular weight cycloolefinic hydrocarbons can be used. Indeed, with regard to some experiments, it was found that the highly aromatic-type hydrocarbon-derived thermoplastic resin somewhat more enhanced the overall composite's resistance to the rusting of the scored grooves of the coated metal (cold rolled steel) substrate.

The discovery of important rust inhibiting features of the composite of this invention is based largely on the manipulating and cooperatively combining selected elements and materials to form a composite which has been found to effectively inhibit rust formation under service conditions.

Although the balance between rust inhibiting features combined with the balance of both good external adhesive and poor internal cohesive strengths of the composite, further combined with the hot melt spray-instant set-up feature, relying on both a heat and sheer viscosity manipulation, may not be completely understood, contributions of various ingredients can be hypothesized.

For example, it is understood, or expected that, in the petroleum sulfonate complex, the sulfonate and carbonate provide resistance to the rusting of a metal surface. The diluent oil, used as a carrier for the sulfonate and carbonate, apparently keeps the composite soft and enables its preparation on a 100 percent solids basis, without requiring the addition of a volatile solvent. The oxidized petrolatum apparently serves somewhat the same function as the diluent oil, provides some viscosity, and tends to be inert. Although the complex is described as a somewhat unitized mixture by itself, it should be understood that in the preparation of the composite, these respective ingredients can be added separately and/or intermittently, if desired.

The microcrystalline wax, of which a portion up to about 10 weight percent can be a paraffin wax, apparently gives the composite coating some integrity. The amount of wax apparently is important since too much wax degrades the composite by making the coating harder with an attendant reduction and resistance to rusting in the presence of salt spray.

The active filler is essentially a non-corrosive metal material which apparently provides a non-corrosive protective barrier through which the salt spray must penetrate in order to substantially reach the coated substrate itself.

The resin additive is a practical binder for the composite and is apparently a major contributor to its adhesion factor to the substrate.

In the practice of this invention the composite has been described as being a rust inhibitor coating, particularly for metal substrates and especially as an undercoat for an automotive vehicle in order to protect its metallic parts. Although the composite has been characterized as a rust inhibitor by its application as coating on a cold rolled steel substrate by ASTM test No. D-117, it is intended that the invention include the composite as a coating on various metals to prevent their oxidation and particularly to metal alloys having an iron content.

While certain representative embodiments and details have been shown for the purpose of illustrating the invention, it will be apparent to those skilled in this art that various changes and modifications may be made therein without departing from the spirit or scope of the invention.

What is claimed is:

1. A sprayable hot melt rust inhibitor composite characterized by being spray-coatable with heat and shear onto a metal substrate at a melt application temperature in the range of about 150° C. to about 180° C. under a hydraulic pressure in the range of about 1000 to about 1500 psi and the resultant coating capable of being heated to a temperature above its said application temperature without exhibiting an appreciable flow; said composite comprising (A) 100 parts by weight of a mixture comprised of (1) about 15 to about 30 weight percent of at least one sulfonate selected from calcium and magnesium sulfonates, (2) about zero to about 10 weight percent of at least one carbonate selected from calcium and magnesium carbonates, (3) about zero to about 8 weight percent of a semi-solid, oxidized petrolatum having a melting point in the range of about 45° C. to about 60° C. and oxidized with oxygen to an extent of about 35 percent to about 65 percent, and (4) about 60 to about 70 weight percent non-volatile diluent oil, (B) about 20 to about 60 parts by weight microcrystalline wax, (C) about 20 to about 40 parts by weight of a particulate filler having a particle size in the range of about 5 to about 40 microns selected from at least one of powdered aluminum basic lead silicochromate, zinc molybdate, strontium molybdate, zinc phosphate and strontium chromate, and (D) about 20 to about 60 parts by weight of at least one hydrocarbon derived thermoplastic resin having a softening point in the range of about 65° C. to about 140° C. and containing carbon-to-carbon unsaturation therein; wherein said hot melt composite is further characterized by having a viscosity in the range of about 4000 to about 15,000 centipoises (cps) at 125° C. as determined by LVF Brookfield viscometer spindle No. 3 at 12 rpm and further characterized by a decreasing viscosity with increasing rate of shear.

2. The composite of claim 2 comprised of (A) 100 parts of a petroleum sulfonate complex in a non-volatile diluent oil comprised of (1) about 18 to about 30 weight percent of said sulfonate, (2) about 7 to about 10 weight percent of said carbonate, (3) about 4 to about 8 weight percent of said oxidized petrolatum and (4) about 60 to about 70 weight percent of said diluent oil, (B) about 20 to about 60 parts by weight of said microcrystalline wax, optionally containing up to about 10 weight percent paraffin wax, (C) about 20 to about 40 parts by weight of said particulate filler and (D) about 20 to about 60 parts by weight of said resin.

3. The composite of claim 2 where said particulate filler is comprised primarily of at least one material selected from powdered aluminum and basic lead silicochromate.

4. The composite of claim 3 where said hydrocarbon derived thermoplastic resin is prepared by polymerizing a monomer mixture with a catalyst selected from at least one of aluminum chloride, ethylaluminum dichloride, boron trifluoride and boron trifluoride etherate, said monomer mixture comprised of (i) a mixture of aliphatic olefins and diolefins, optionally containing about 5 to about 65 weight percent aromatic hydrocarbons, based on the monomer mixture or (ii) a mixture comprised of (A) at least one of vinyl toluene, α-methyl styrene or styrene and (B) at least one cycloolefin selected from dicyclopentadiene, cyclopentadiene, cyclopentene, cyclohexene and cycloheptene.

5. The composite of claim 4 where said hydrocarbon resin is prepared by polymerizing in the presence of aluminum chloride a monomer mixture comprised of (i) a mixture of diolefin and olefin in a weight ratio in the range of about 0.8/1 to about 4/1, optionally modified by the addition of about 2 to about 15 weight percent dicyclopentadiene, based on the monomer mixture and/or further optionally modified by the addition of about 5 to about 65 weight percent α-methyl styrene, based on the monomer mixture or (ii) a monomer mixture comprised of (A) vinyl toluene and (B) at least one cycloolefin selected from dicyclopentadiene and cyclopentadiene.

6. The composite of claim 5 where said hydrocarbon resin is prepared by polymerizing a monomer mixture comprised of (i) piperylene and at least one olefin comprised primarily of 2-methyl-2-butene, optionally modified with the addition of said α-methyl styrene or (ii) a mixture of a monomer mixture of vinyl toluene and dicyclopentadiene.

7. A coated metal substrate having as an adherent coating thereon of the hot melt composite of claim 1.

8. The coated metal substrate of claim 7 where said substrate is cold rolled steel.

9. The composite of claim 1 characterized by inhibiting the formation of rust, when it is an adherent coating on a cold rolled steel substrate, according to a salt spray test prescribed by ASTM #D-117.

10. An automotive vehicle having an outer, protective undercoating thereon beneath the vehicle of the hot melt composite of claim 1.

11. A coated metal substrate prepared by the method which comprises spraying the hot melt composite of claim 1 under shear at a temperature in the range of about 150° C. to about 180° C. to a metal substrate having a temperature in the range of about 20° C. to about 40° C., where the applied fluid composite sets up within about 10 seconds on the substrate to provide an adherent coating thereon having a thickness in the range of about 3 to about 15 mils.

12. The coated substrate of claim 11 where an uncoated portion thereof is subsequently coated with a paint and then is heated to a temperature above the previous temperature of the hot melt application in order to bake the paint coating thereon.

13. The method of preparing the composite of claim 1 by the sequential steps of (A) melting together the microcrystalline wax, thermoplastic resin, sulfonate, carbonate, diluent oil and petrolatum at a temperature in the range of about 90° C. to about 150° C., and (B) mixing therewith the active filler at a temperature in the range of about 90° C. to about 150° C.

14. The composite of claim 1 where the component (A) is a petroleum sulfonate complex added as an independent mixture to the composite.

15. The coated substrate of claim 7 where said substrate is a metal having an iron content.

16. The automotive vehicle of claim 10 wherein said hot melt composite is a protective undercoating for a metal alloy having an iron content.

* * * * *